(12) United States Patent
Scheuermann (10) Patent No.: US 7,489,779 B2
(45) Date of Patent: Feb. 10, 2009

(54) HARDWARE IMPLEMENTATION OF THE SECURE HASH STANDARD

(75) Inventor: Walter James Scheuermann, Saratoga, CA (US)

(73) Assignee: QSTHoldings, LLC, Palo Alto, CA (US)

( * ) Notice: Subject to any disclaimer, the term of this patent is extended or adjusted under 35 U.S.C. 154(b) by 526 days.

(21) Appl. No.: 10/093,156

(22) Filed: Mar. 5, 2002

(65) Prior Publication Data
US 2003/0135743 A1    Jul. 17, 2003

Related U.S. Application Data

(63) Continuation-in-part of application No. 09/815,122, filed on Mar. 22, 2001, now Pat. No. 6,836,839.

(51) Int. Cl.
G06F 15/16 (2006.01)
G06F 15/76 (2006.01)
H03K 17/18 (2006.01)
H04K 1/00 (2006.01)
H04L 9/00 (2006.01)

(52) U.S. Cl. ............................. 380/28; 712/15; 712/29; 712/37; 716/16

(58) Field of Classification Search .................. 380/28; 713/161, 164, 201, 16; 703/2; 712/15, 29, 712/37; 716/16
See application file for complete search history.

(56) References Cited

U.S. PATENT DOCUMENTS

| | | | |
|---|---|---|---|
| 3,409,175 A | 11/1968 | Byrne | |
| 3,666,143 A | 5/1972 | Weston | |
| 3,938,639 A | 2/1976 | Birrell | |
| 3,949,903 A | 4/1976 | Benasutti et al. | |
| 3,960,298 A | 6/1976 | Birrell | |
| 3,967,062 A | 6/1976 | Dobias | |
| 3,991,911 A | 11/1976 | Shannon et al. | |
| 3,995,441 A | 12/1976 | McMillin | |
| 4,076,145 A | 2/1978 | Zygiel, deceased | |
| 4,143,793 A | 3/1979 | McMillin et al. | |
| 4,172,669 A | 10/1979 | Edelbach | |

(Continued)

FOREIGN PATENT DOCUMENTS

| | | |
|---|---|---|
| DE | 100 18 374 A1 | 10/2001 |
| EP | 0 301 169 A1 | 2/1989 |
| EP | 0 166 586 B1 | 1/1991 |
| EP | 0 236 633 B1 | 5/1991 |
| EP | 0 478 624 B1 | 4/1992 |
| EP | 0 479 102 A2 | 4/1992 |
| EP | 0 661 831 A2 | 7/1995 |
| EP | 0 668 659 A2 | 8/1995 |
| EP | 0 690 588 A2 | 1/1996 |
| EP | 0 691 754 A2 | 1/1996 |

(Continued)

OTHER PUBLICATIONS

Chen, Dev C. et al. "A reconfigurable multiprocessor IC for rapid prototyping ofalgorithmic-specific high-speed DSP data paths", IEEE Journal of Solid-State Circuits, 1992, IEEE.*

(Continued)

*Primary Examiner*—Michael J Simitoski
(74) *Attorney, Agent, or Firm*—Marc S. Kaufman; Wayne Tang; Nixon Peabody LLP (57) ABSTRACT

An integrated circuit for implementing the secure hash algorithm is provided. According to one aspect of the integrated circuit, the integrated circuit includes a data path and a controller controlling operation of the data path. According to another aspect of the integrated circuit, the data path is capable of handling each round of processing reiteratively. The controller further includes an address control module and a finite state machine.

21 Claims, 7 Drawing Sheets

U.S. PATENT DOCUMENTS

| | | |
|---|---|---|
| 4,174,872 A | 11/1979 | Fessler |
| 4,181,242 A | 1/1980 | Zygiel, deceased et al. |
| RE30,301 E | 6/1980 | Zygiel, deceased |
| 4,218,014 A | 8/1980 | Tracy |
| 4,222,972 A | 9/1980 | Caldwell |
| 4,237,536 A | 12/1980 | Enelow et al. |
| 4,252,253 A | 2/1981 | Shannon |
| 4,302,775 A | 11/1981 | Widergren et al. |
| 4,333,587 A | 6/1982 | Fessler et al. |
| 4,354,613 A | 10/1982 | Desai et al. |
| 4,377,246 A | 3/1983 | McMillin et al. |
| 4,393,468 A | 7/1983 | New |
| 4,413,752 A | 11/1983 | McMillin et al. |
| 4,458,584 A | 7/1984 | Annese et al. |
| 4,466,342 A | 8/1984 | Basile et al. |
| 4,475,448 A | 10/1984 | Shoaf et al. |
| 4,509,690 A | 4/1985 | Austin et al. |
| 4,520,950 A | 6/1985 | Jeans |
| 4,549,675 A | 10/1985 | Austin |
| 4,553,573 A | 11/1985 | McGarrah |
| 4,560,089 A | 12/1985 | McMillin et al. |
| 4,577,782 A | 3/1986 | Fessler |
| 4,578,799 A | 3/1986 | Scholl et al. |
| RE32,179 E | 6/1986 | Sedam et al. |
| 4,633,386 A | 12/1986 | Terepin et al. |
| 4,658,988 A | 4/1987 | Hassell |
| 4,694,416 A | 9/1987 | Wheeler et al. |
| 4,711,374 A | 12/1987 | Gaunt et al. |
| 4,713,755 A | 12/1987 | Worley, Jr. et al. |
| 4,719,056 A | 1/1988 | Scott |
| 4,726,494 A | 2/1988 | Scott |
| 4,747,516 A | 5/1988 | Baker |
| 4,748,585 A | 5/1988 | Chiarulli et al. |
| 4,760,525 A | 7/1988 | Webb |
| 4,760,544 A | 7/1988 | Lamb |
| 4,765,513 A | 8/1988 | McMillin et al. |
| 4,766,548 A | 8/1988 | Cedrone et al. |
| 4,781,309 A | 11/1988 | Vogel |
| 4,800,492 A | 1/1989 | Johnson et al. |
| 4,811,214 A | 3/1989 | Nosenchuck et al. |
| 4,824,075 A | 4/1989 | Holzboog |
| 4,827,426 A | 5/1989 | Patton et al. |
| 4,850,269 A | 7/1989 | Hancock et al. |
| 4,856,684 A | 8/1989 | Gerstung |
| 4,901,887 A | 2/1990 | Burton |
| 4,921,315 A | 5/1990 | Metcalfe et al. |
| 4,930,666 A | 6/1990 | Rudick |
| 4,932,564 A | 6/1990 | Austin, deceased et al. |
| 4,936,488 A | 6/1990 | Austin |
| 4,937,019 A | 6/1990 | Scott |
| 4,960,261 A | 10/1990 | Scott et al. |
| 4,961,533 A | 10/1990 | Teller et al. |
| 4,967,340 A | 10/1990 | Dawes |
| 4,974,643 A | 12/1990 | Bennett et al. |
| 4,982,876 A | 1/1991 | Scott |
| 4,993,604 A | 2/1991 | Gaunt et al. |
| 5,007,560 A | 4/1991 | Sassak |
| 5,021,947 A | 6/1991 | Campbell et al. |
| 5,040,106 A | 8/1991 | Maag |
| 5,044,171 A | 9/1991 | Farkas |
| 5,090,015 A | 2/1992 | Dabbish et al. |
| 5,129,549 A | 7/1992 | Austin |
| 5,139,708 A | 8/1992 | Scott |
| 5,156,301 A | 10/1992 | Hassell et al. |
| 5,156,871 A | 10/1992 | Goulet et al. |
| 5,165,575 A | 11/1992 | Scott |
| 5,190,083 A | 3/1993 | Gupta et al. |
| 5,190,189 A | 3/1993 | Zimmer et al. |
| 5,193,151 A | 3/1993 | Jain |
| 5,193,718 A | 3/1993 | Hassell et al. |
| 5,202,993 A | 4/1993 | Tarsy et al. |
| 5,203,474 A | 4/1993 | Haynes |
| 5,240,144 A | 8/1993 | Feldman |
| 5,261,099 A | 11/1993 | Bigo et al. |
| 5,263,509 A | 11/1993 | Cherry et al. |
| 5,269,442 A | 12/1993 | Vogel |
| 5,280,711 A | 1/1994 | Motta et al. |
| 5,297,400 A | 3/1994 | Benton et al. |
| 5,301,100 A | 4/1994 | Wagner |
| 5,303,846 A | 4/1994 | Shannon |
| 5,335,276 A | 8/1994 | Thompson et al. |
| 5,339,428 A | 8/1994 | Burmeister et al. |
| 5,343,716 A | 9/1994 | Swanson et al. |
| 5,361,362 A | 11/1994 | Benkeser et al. |
| 5,368,198 A | 11/1994 | Goulet |
| 5,379,343 A | 1/1995 | Grube et al. |
| 5,381,546 A | 1/1995 | Servi et al. |
| 5,381,550 A | 1/1995 | Jourdenais et al. |
| 5,388,212 A | 2/1995 | Grube et al. |
| 5,392,960 A | 2/1995 | Kendt et al. |
| 5,437,395 A | 8/1995 | Bull et al. |
| 5,450,557 A * | 9/1995 | Kopp et al. .................. 712/24 |
| 5,454,406 A | 10/1995 | Rejret et al. |
| 5,465,368 A | 11/1995 | Davidson et al. |
| 5,479,055 A | 12/1995 | Eccles |
| 5,490,165 A | 2/1996 | Blakeney, II et al. |
| 5,491,823 A | 2/1996 | Ruttenberg |
| 5,507,009 A | 4/1996 | Grube et al. |
| 5,515,519 A | 5/1996 | Yoshioka et al. |
| 5,517,600 A | 5/1996 | Shimokawa |
| 5,519,694 A | 5/1996 | Brewer et al. |
| 5,522,070 A | 5/1996 | Sumimoto |
| 5,530,964 A | 6/1996 | Alpert et al. |
| 5,534,796 A | 7/1996 | Edwards |
| 5,542,265 A | 8/1996 | Rutland |
| 5,553,755 A | 9/1996 | Bonewald et al. |
| 5,555,417 A | 9/1996 | Odnert et al. |
| 5,560,028 A | 9/1996 | Sachs et al. |
| 5,560,038 A | 9/1996 | Haddock |
| 5,570,587 A | 11/1996 | Kim |
| 5,572,572 A | 11/1996 | Kawan et al. |
| 5,590,353 A | 12/1996 | Sakakibara et al. |
| 5,594,657 A * | 1/1997 | Cantone et al. ............... 716/16 |
| 5,600,810 A | 2/1997 | Ohkami |
| 5,600,844 A | 2/1997 | Shaw et al. |
| 5,602,833 A | 2/1997 | Zehavi |
| 5,603,043 A | 2/1997 | Taylor et al. |
| 5,607,083 A | 3/1997 | Vogel et al. |
| 5,608,643 A | 3/1997 | Wichter et al. |
| 5,611,867 A | 3/1997 | Cooper et al. |
| 5,623,545 A * | 4/1997 | Childs et al. .................... 38/2 |
| 5,625,669 A | 4/1997 | McGregor et al. |
| 5,626,407 A | 5/1997 | Westcott |
| 5,630,206 A | 5/1997 | Urban et al. |
| 5,635,940 A | 6/1997 | Hickman et al. |
| 5,646,544 A * | 7/1997 | Iadanza ...................... 326/38 |
| 5,646,545 A | 7/1997 | Trimberger et al. |
| 5,647,512 A | 7/1997 | Assis Mascarenhas deOliveira et al. |
| 5,667,110 A | 9/1997 | McCann et al. |
| 5,684,793 A | 11/1997 | Kiema et al. |
| 5,684,980 A | 11/1997 | Casselman |
| 5,687,236 A | 11/1997 | Moskowitz et al. |
| 5,694,613 A | 12/1997 | Suzuki |
| 5,694,794 A | 12/1997 | Jerg et al. |
| 5,699,328 A | 12/1997 | Ishizaki et al. |
| 5,701,482 A | 12/1997 | Harrison et al. |
| 5,704,053 A | 12/1997 | Santhanam |
| 5,706,191 A | 1/1998 | Bassett et al. |
| 5,706,976 A | 1/1998 | Purkey |
| 5,712,996 A | 1/1998 | Schepers |
| 5,720,002 A | 2/1998 | Wang |
| 5,721,693 A | 2/1998 | Song |
| 5,721,854 A | 2/1998 | Ebcioglu et al. |

| | | | | | | |
|---|---|---|---|---|---|---|
| 5,732,563 A | 3/1998 | Bethuy et al. | | 6,006,249 A | 12/1999 | Leong |
| 5,734,808 A | 3/1998 | Takeda | | 6,016,395 A | 1/2000 | Mohamed |
| 5,737,631 A | 4/1998 | Trimberger | | 6,021,186 A | 2/2000 | Suzuki et al. |
| 5,742,180 A | 4/1998 | DeHon et al. | | 6,021,492 A | 2/2000 | May |
| 5,742,821 A | 4/1998 | Prasanna | | 6,023,742 A * | 2/2000 | Ebeling et al. .............. 710/107 |
| 5,745,366 A | 4/1998 | Higham et al. | | 6,023,755 A | 2/2000 | Casselman |
| RE35,780 E | 5/1998 | Hassell et al. | | 6,028,610 A | 2/2000 | Deering |
| 5,751,295 A | 5/1998 | Becklund et al. | | 6,036,166 A | 3/2000 | Olson |
| 5,754,227 A | 5/1998 | Fukuoka | | 6,039,219 A | 3/2000 | Bach et al. |
| 5,758,261 A | 5/1998 | Wiedeman | | 6,041,322 A | 3/2000 | Meng et al. |
| 5,768,561 A | 6/1998 | Wise | | 6,041,970 A | 3/2000 | Vogel |
| 5,778,439 A | 7/1998 | Trimberger et al. | | 6,046,603 A | 4/2000 | New |
| 5,784,636 A * | 7/1998 | Rupp ........................... 712/37 | | 6,047,115 A | 4/2000 | Mohan et al. |
| 5,787,237 A | 7/1998 | Reilly | | 6,052,600 A | 4/2000 | Fette et al. |
| 5,790,817 A | 8/1998 | Asghar et al. | | 6,055,314 A | 4/2000 | Spies et al. |
| 5,791,517 A | 8/1998 | Avital | | 6,056,194 A | 5/2000 | Kolls |
| 5,791,523 A | 8/1998 | Oh | | 6,059,840 A | 5/2000 | Click, Jr. |
| 5,794,062 A | 8/1998 | Baxter | | 6,061,580 A | 5/2000 | Altschul et al. |
| 5,794,067 A | 8/1998 | Kadowaki | | 6,073,132 A | 6/2000 | Gehman |
| 5,802,055 A | 9/1998 | Krein et al. | | 6,076,174 A | 6/2000 | Freund |
| 5,818,603 A | 10/1998 | Motoyama | | 6,078,736 A | 6/2000 | Guccione |
| 5,822,308 A | 10/1998 | Weigand et al. | | 6,085,740 A | 7/2000 | Ivri et al. |
| 5,822,313 A | 10/1998 | Malek et al. | | 6,088,043 A | 7/2000 | Kelleher et al. |
| 5,822,360 A | 10/1998 | Lee et al. | | 6,091,263 A | 7/2000 | New et al. |
| 5,828,858 A | 10/1998 | Athanas et al. | | 6,091,765 A | 7/2000 | Pietzold, III et al. |
| 5,829,085 A | 11/1998 | Jerg et al. | | 6,094,065 A | 7/2000 | Tavana et al. |
| 5,835,753 A | 11/1998 | Witt | | 6,094,726 A | 7/2000 | Gonion et al. |
| 5,838,165 A | 11/1998 | Chatter | | 6,111,893 A | 8/2000 | Volftsun et al. |
| 5,845,815 A | 12/1998 | Vogel | | 6,111,935 A | 8/2000 | Hughes-Hartogs |
| 5,860,021 A | 1/1999 | Klingman | | 6,115,751 A | 9/2000 | Tam et al. |
| 5,862,961 A | 1/1999 | Motta et al. | | 6,120,551 A | 9/2000 | Law et al. |
| 5,870,427 A | 2/1999 | Teidemann, Jr. et al. | | 6,122,670 A | 9/2000 | Bennett et al. |
| 5,873,045 A | 2/1999 | Lee et al. | | 6,138,693 A | 10/2000 | Matz |
| 5,881,106 A | 3/1999 | Cartier | | 6,141,283 A | 10/2000 | Bogin et al. |
| 5,884,284 A | 3/1999 | Peters et al. | | 6,150,838 A | 11/2000 | Wittig et al. |
| 5,886,537 A | 3/1999 | Macias et al. | | 6,154,494 A | 11/2000 | Sugahara et al. |
| 5,887,174 A | 3/1999 | Simons et al. | | 6,157,997 A | 12/2000 | Oowaki et al. |
| 5,889,816 A | 3/1999 | Agrawal et al. | | 6,175,854 B1 | 1/2001 | Bretscher |
| 5,890,014 A | 3/1999 | Long | | 6,175,892 B1 | 1/2001 | Sazzad et al. |
| 5,892,900 A | 4/1999 | Ginter et al. | | 6,181,981 B1 | 1/2001 | Varga et al. |
| 5,892,961 A * | 4/1999 | Trimberger ................... 712/10 | | 6,185,418 B1 | 2/2001 | MacLellan et al. |
| 5,894,473 A | 4/1999 | Dent | | 6,192,070 B1 | 2/2001 | Poon et al. |
| 5,901,884 A | 5/1999 | Goulet et al. | | 6,192,255 B1 | 2/2001 | Lewis et al. |
| 5,903,886 A | 5/1999 | Heimlich et al. | | 6,192,388 B1 | 2/2001 | Cajolet |
| 5,907,285 A | 5/1999 | Toms et al. | | 6,195,788 B1 | 2/2001 | Leaver et al. |
| 5,907,580 A | 5/1999 | Cummings | | 6,198,924 B1 | 3/2001 | Ishii et al. |
| 5,910,733 A | 6/1999 | Bertolet et al. | | 6,199,181 B1 | 3/2001 | Rechef et al. |
| 5,912,572 A | 6/1999 | Graf, III | | 6,202,130 B1 | 3/2001 | Scales, III et al. |
| 5,913,172 A | 6/1999 | McCabe et al. | | 6,219,697 B1 | 4/2001 | Lawande et al. |
| 5,917,852 A | 6/1999 | Butterfield et al. | | 6,219,756 B1 | 4/2001 | Kasamizugami |
| 5,920,801 A | 7/1999 | Thomas et al. | | 6,219,780 B1 | 4/2001 | Lipasti |
| 5,931,918 A | 8/1999 | Row et al. | | 6,223,222 B1 | 4/2001 | Fijolek et al. |
| 5,933,642 A | 8/1999 | Greenbaum et al. | | 6,226,387 B1 | 5/2001 | Tewfik et al. |
| 5,940,438 A | 8/1999 | Poon et al. | | 6,230,307 B1 * | 5/2001 | Davis et al. ................... 716/16 |
| 5,949,415 A | 9/1999 | Lin et al. | | 6,237,029 B1 * | 5/2001 | Master et al. ............... 709/217 |
| 5,950,011 A | 9/1999 | Albrecht et al. | | 6,246,883 B1 | 6/2001 | Lee |
| 5,950,131 A | 9/1999 | Vilmur | | 6,247,125 B1 | 6/2001 | Noel-Baron et al. |
| 5,951,674 A | 9/1999 | Moreno | | 6,249,251 B1 | 6/2001 | Chang et al. |
| 5,953,322 A | 9/1999 | Kimball | | 6,258,725 B1 | 7/2001 | Lee et al. |
| 5,956,518 A | 9/1999 | DeHon et al. | | 6,263,057 B1 | 7/2001 | Silverman |
| 5,956,967 A | 9/1999 | Kim | | 6,266,760 B1 * | 7/2001 | DeHon et al. .................. 712/15 |
| 5,959,811 A | 9/1999 | Richardson | | 6,272,579 B1 | 8/2001 | Lentz et al. |
| 5,959,881 A | 9/1999 | Trimberger et al. | | 6,281,703 B1 | 8/2001 | Furuta et al. |
| 5,963,048 A | 10/1999 | Harrison et al. | | 6,282,627 B1 | 8/2001 | Wong et al. |
| 5,966,534 A * | 10/1999 | Cooke et al. ................. 717/155 | | 6,289,375 B1 | 9/2001 | Knight et al. |
| 5,970,254 A | 10/1999 | Cooke et al. | | 6,289,434 B1 | 9/2001 | Roy |
| 5,987,105 A | 11/1999 | Jenkins et al. | | 6,289,488 B1 | 9/2001 | Dave et al. |
| 5,987,611 A | 11/1999 | Freund | | 6,292,822 B1 | 9/2001 | Hardwick |
| 5,991,302 A | 11/1999 | Berl et al. | | 6,292,827 B1 | 9/2001 | Raz |
| 5,991,308 A | 11/1999 | Fuhrmann et al. | | 6,292,830 B1 | 9/2001 | Taylor et al. |
| 5,993,739 A | 11/1999 | Lyon | | 6,301,653 B1 | 10/2001 | Mohamed et al. |
| 5,999,734 A | 12/1999 | Willis et al. | | 6,305,014 B1 | 10/2001 | Roediger et al. |
| 6,005,943 A | 12/1999 | Cohen et al. | | 6,311,149 B1 | 10/2001 | Ryan et al. |

| | | |
|---|---|---|
| 6,321,985 B1 | 11/2001 | Kolls |
| 6,346,824 B1 | 2/2002 | New |
| 6,347,346 B1 | 2/2002 | Taylor |
| 6,349,394 B1 | 2/2002 | Brock et al. |
| 6,353,841 B1 * | 3/2002 | Marshall et al. ............ 708/232 |
| 6,356,994 B1 | 3/2002 | Barry et al. |
| 6,359,248 B1 | 3/2002 | Mardi |
| 6,360,256 B1 | 3/2002 | Lim |
| 6,360,259 B1 | 3/2002 | Bradley |
| 6,360,263 B1 | 3/2002 | Kurtzberg et al. |
| 6,363,411 B1 | 3/2002 | Dugan et al. |
| 6,366,999 B1 | 4/2002 | Drabenstott et al. |
| 6,377,983 B1 | 4/2002 | Cohen et al. |
| 6,378,072 B1 * | 4/2002 | Collins et al. ............... 713/187 |
| 6,381,735 B1 | 4/2002 | Hunt |
| 6,385,751 B1 | 5/2002 | Wolf |
| 6,405,214 B1 | 6/2002 | Meade, II |
| 6,408,039 B1 | 6/2002 | Ito |
| 6,410,941 B1 | 6/2002 | Taylor et al. |
| 6,411,612 B1 | 6/2002 | Halford et al. |
| 6,421,372 B1 | 7/2002 | Bierly et al. |
| 6,421,809 B1 | 7/2002 | Wuytack et al. |
| 6,430,624 B1 | 8/2002 | Jamtgaard et al. |
| 6,433,578 B1 | 8/2002 | Wasson |
| 6,434,590 B1 | 8/2002 | Blelloch et al. |
| 6,438,737 B1 | 8/2002 | Morelli et al. |
| 6,456,996 B1 | 9/2002 | Crawford, Jr. et al. |
| 6,459,883 B2 | 10/2002 | Subramanian et al. |
| 6,473,609 B1 | 10/2002 | Schwartz et al. |
| 6,507,947 B1 | 1/2003 | Schreiber et al. |
| 6,510,138 B1 | 1/2003 | Pannell |
| 6,510,510 B1 | 1/2003 | Garde |
| 6,538,470 B1 | 3/2003 | Langhammer et al. |
| 6,556,044 B2 | 4/2003 | Langhammer et al. |
| 6,563,891 B1 | 5/2003 | Eriksson et al. |
| 6,570,877 B1 | 5/2003 | Kloth et al. |
| 6,577,678 B2 | 6/2003 | Scheuermann |
| 6,587,684 B1 | 7/2003 | Hsu et al. |
| 6,590,415 B2 | 7/2003 | Agrawal et al. |
| 6,601,086 B1 | 7/2003 | Howard et al. |
| 6,601,158 B1 | 7/2003 | Abbott et al. |
| 6,604,085 B1 | 8/2003 | Kolls |
| 6,606,529 B1 | 8/2003 | Crowder, Jr. et al. |
| 6,615,333 B1 | 9/2003 | Hoogerbrugge et al. |
| 6,618,434 B2 | 9/2003 | Heidari-Bateni et al. |
| 6,640,304 B2 | 10/2003 | Ginter et al. |
| 6,653,859 B2 | 11/2003 | Sihlbom et al. |
| 6,675,265 B2 | 1/2004 | Barroso et al. |
| 6,691,148 B1 | 2/2004 | Zinky et al. |
| 6,711,617 B1 | 3/2004 | Bantz et al. |
| 6,718,182 B1 | 4/2004 | Kung |
| 6,721,286 B1 | 4/2004 | Williams et al. |
| 6,721,884 B1 | 4/2004 | De Oliveira Kastrup Pereira et al. |
| 6,732,354 B2 | 5/2004 | Ebeling et al. |
| 6,735,621 B1 | 5/2004 | Yoakum et al. |
| 6,738,744 B2 | 5/2004 | Kirovski et al. |
| 6,748,360 B2 | 6/2004 | Pitman et al. |
| 6,754,470 B2 | 6/2004 | Hendrickson et al. |
| 6,760,587 B2 | 7/2004 | Holtzman et al. |
| 6,766,165 B2 | 7/2004 | Sharma et al. |
| 6,778,212 B1 | 8/2004 | Deng et al. |
| 6,785,341 B2 | 8/2004 | Walton et al. |
| 6,819,140 B2 | 11/2004 | Yamanaka et al. |
| 6,823,448 B2 | 11/2004 | Roth et al. |
| 6,829,633 B2 | 12/2004 | Gelfer et al. |
| 6,832,250 B1 | 12/2004 | Coons et al. |
| 6,836,839 B2 | 12/2004 | Master et al. |
| 6,865,664 B2 | 3/2005 | Budrovic et al. |
| 6,871,236 B2 | 3/2005 | Fishman et al. |
| 6,883,084 B1 | 4/2005 | Donohoe |
| 6,894,996 B2 | 5/2005 | Lee |
| 6,901,440 B1 | 5/2005 | Bimm et al. |
| 6,912,515 B2 | 6/2005 | Jackson et al. |
| 6,985,517 B2 | 1/2006 | Matsumoto et al. |
| 6,986,021 B2 | 1/2006 | Master et al. |
| 6,988,139 B1 | 1/2006 | Jervis et al. |
| 7,032,229 B1 | 4/2006 | Flores et al. |
| 7,044,741 B2 | 5/2006 | Leem |
| 7,082,456 B2 | 7/2006 | Mani-Meitav et al. |
| 7,139,910 B1 * | 11/2006 | Ainsworth et al. .......... 713/155 |
| 7,142,731 B1 | 11/2006 | Toi |
| 7,249,242 B2 | 7/2007 | Ramchandran |
| 2001/0003191 A1 | 6/2001 | Kovacs et al. |
| 2001/0023482 A1 | 9/2001 | Wray |
| 2001/0029515 A1 | 10/2001 | Mirsky |
| 2001/0034795 A1 | 10/2001 | Moulton et al. |
| 2001/0039654 A1 | 11/2001 | Miyamoto |
| 2001/0048713 A1 | 12/2001 | Medlock et al. |
| 2001/0048714 A1 | 12/2001 | Jha |
| 2001/0050948 A1 | 12/2001 | Ramberg et al. |
| 2002/0010848 A1 | 1/2002 | Kamano et al. |
| 2002/0013799 A1 | 1/2002 | Blaker |
| 2002/0013937 A1 | 1/2002 | Ostanevich et al. |
| 2002/0015435 A1 | 2/2002 | Rieken |
| 2002/0015439 A1 | 2/2002 | Kohli et al. |
| 2002/0023210 A1 | 2/2002 | Tuomenoksa et al. |
| 2002/0024942 A1 | 2/2002 | Tsuneki et al. |
| 2002/0024993 A1 | 2/2002 | Subramanian et al. |
| 2002/0031166 A1 | 3/2002 | Subramanian et al. |
| 2002/0032551 A1 * | 3/2002 | Zakiya ......................... 703/2 |
| 2002/0035623 A1 | 3/2002 | Lawande et al. |
| 2002/0041581 A1 | 4/2002 | Aramaki |
| 2002/0042907 A1 | 4/2002 | Yamanaka et al. |
| 2002/0061741 A1 | 5/2002 | Leung et al. |
| 2002/0069282 A1 | 6/2002 | Reisman |
| 2002/0072830 A1 | 6/2002 | Hunt |
| 2002/0078337 A1 | 6/2002 | Moreau et al. |
| 2002/0083305 A1 | 6/2002 | Renard et al. |
| 2002/0083423 A1 | 6/2002 | Ostanevich et al. |
| 2002/0087829 A1 | 7/2002 | Snyder et al. |
| 2002/0089348 A1 | 7/2002 | Langhammer |
| 2002/0101909 A1 | 8/2002 | Chen et al. |
| 2002/0107905 A1 | 8/2002 | Roe et al. |
| 2002/0107962 A1 | 8/2002 | Richter et al. |
| 2002/0119803 A1 | 8/2002 | Bitterlich et al. |
| 2002/0120672 A1 | 8/2002 | Butt et al. |
| 2002/0138716 A1 | 9/2002 | Master et al. |
| 2002/0141489 A1 | 10/2002 | Imaizumi |
| 2002/0147845 A1 | 10/2002 | Sanchez-Herrero et al. |
| 2002/0159503 A1 | 10/2002 | Ramachandran |
| 2002/0162026 A1 | 10/2002 | Neuman et al. |
| 2002/0168018 A1 | 11/2002 | Scheuermann |
| 2002/0181559 A1 | 12/2002 | Heidari-Bateni et al. |
| 2002/0184291 A1 | 12/2002 | Hogenauer |
| 2002/0184498 A1 * | 12/2002 | Qi ............................ 713/168 |
| 2002/0191790 A1 | 12/2002 | Anand et al. |
| 2003/0007606 A1 | 1/2003 | Suder et al. |
| 2003/0012270 A1 | 1/2003 | Zhou et al. |
| 2003/0018446 A1 | 1/2003 | Makowski et al. |
| 2003/0018700 A1 | 1/2003 | Giroti et al. |
| 2003/0023830 A1 | 1/2003 | Hogenauer |
| 2003/0026242 A1 | 2/2003 | Jokinen et al. |
| 2003/0030004 A1 | 2/2003 | Dixon et al. |
| 2003/0046421 A1 | 3/2003 | Horvitz et al. |
| 2003/0061260 A1 | 3/2003 | Rajkumar |
| 2003/0061311 A1 | 3/2003 | Lo |
| 2003/0063656 A1 | 4/2003 | Rao et al. |
| 2003/0076815 A1 | 4/2003 | Miller et al. |
| 2003/0099223 A1 | 5/2003 | Chang et al. |
| 2003/0102889 A1 | 6/2003 | Master et al. |
| 2003/0105949 A1 | 6/2003 | Master et al. |
| 2003/0110485 A1 | 6/2003 | Lu et al. |
| 2003/0142818 A1 | 7/2003 | Raghunathan et al. |
| 2003/0154357 A1 | 8/2003 | Master et al. |
| 2003/0163723 A1 | 8/2003 | Kozuch et al. |
| 2003/0172138 A1 | 9/2003 | McCormack et al. |

| | | | |
|---|---|---|---|
| 2003/0172139 | A1 | 9/2003 | Srinivasan et al. |
| 2003/0200538 | A1 | 10/2003 | Ebeling et al. |
| 2003/0212684 | A1 | 11/2003 | Meyer et al. |
| 2004/0006584 | A1 | 1/2004 | Vandeweerd |
| 2004/0010645 | A1 | 1/2004 | Scheuermann et al. |
| 2004/0015970 | A1 | 1/2004 | Scheuermann |
| 2004/0025159 | A1 | 2/2004 | Scheuermann et al. |
| 2004/0057505 | A1 | 3/2004 | Valio |
| 2004/0062300 | A1 | 4/2004 | McDonough et al. |
| 2004/0081248 | A1 | 4/2004 | Parolari |
| 2004/0093479 | A1 | 5/2004 | Ramchandran |
| 2004/0168044 | A1 | 8/2004 | Ramchandran |
| 2005/0166038 | A1 | 7/2005 | Wang et al. |
| 2005/0198199 | A1 | 9/2005 | Dowling |
| 2006/0031660 | A1 | 2/2006 | Master et al. |

FOREIGN PATENT DOCUMENTS

| | | |
|---|---|---|
| EP | 0 768 602 A2 | 4/1997 |
| EP | 0 817 003 A2 | 1/1998 |
| EP | 0 821 495 A2 | 1/1998 |
| EP | 0 866 210 A2 | 9/1998 |
| EP | 0 923 247 A2 | 6/1999 |
| EP | 0 926 596 A2 | 6/1999 |
| EP | 1 056 217 A2 | 11/2000 |
| EP | 1 061 437 A1 | 12/2000 |
| EP | 1 061 443 A2 | 12/2000 |
| EP | 1 126 368 A2 | 8/2001 |
| EP | 1 150 506 A2 | 10/2001 |
| EP | 1 189 358 A1 | 3/2002 |
| GB | 2 067 800 A | 7/1981 |
| GB | 2 237 908 A | 5/1991 |
| JP | 62-249456 | 10/1987 |
| JP | 63-147258 | 6/1988 |
| JP | 4-51546 | 2/1992 |
| JP | 7-064789 | 3/1995 |
| JP | 7066718 | 3/1995 |
| JP | 10233676 | 9/1998 |
| JP | 10254696 | 9/1998 |
| JP | 11296345 | 10/1999 |
| JP | 2000315731 | 11/2000 |
| JP | 2001-053703 | 2/2001 |
| WO | WO 89/05029 A1 | 6/1989 |
| WO | WO 89/11443 A2 | 11/1989 |
| WO | WO 91/00238 A1 | 1/1991 |
| WO | WO 93/13603 A1 | 7/1993 |
| WO | WO 95/11855 A1 | 5/1995 |
| WO | WO 96/33558 A1 | 10/1996 |
| WO | WO 98/32071 | 1/1998 |
| WO | WO 98/32071 A3 | 7/1998 |
| WO | WO 99/03776 A1 | 1/1999 |
| WO | WO 99/21094 A2 | 4/1999 |
| WO | WO 99/26860 A1 | 6/1999 |
| WO | WO 99/65818 A1 | 12/1999 |
| WO | WO 00/19311 A1 | 4/2000 |
| WO | WO 00/65855 A1 | 11/2000 |
| WO | WO 00/69073 A1 | 11/2000 |
| WO | WO 01/11281 A1 | 2/2001 |
| WO | WO 01/22235 A1 | 3/2001 |
| WO | WO 01/76129 A2 | 3/2001 |
| WO | WO 01/76129 A2 | 10/2001 |
| WO | WO 02/12978 A2 | 2/2002 |

OTHER PUBLICATIONS

Deepakumara, Janaka, et al. "FPGA implementation of MD5 hash algorithm", Canadian Conference on Electrical and Computer Engineering, 2001, IEEE.*

Dominikus, Sandra. "A hardware implementation of MD4-family hash algorithms", 9th International Conference on Electronics, Circuits and Systems, 2002, IEEE.*

Abnous et al., "Ultra-Low-Power Domain-Specific Multimedia Processors," VLSI Signal Processing, IX, 1998, IEEE Workshop in San Francisco, CA, USA, Oct. 30-Nov. 1, 1998, pp. 461-470 (Oct. 30, 1998).

Aggarwal, et al.., "Efficient Huffman Decoding," International Conference on Image Processing IEEE 1:936-939 (Sep. 10-13, 2000).

Allan et al., "Software Pipelining," ACM Computing Surveys, 27(3):1-78 (Sep. 1995).

Alsolaim et al., "Architecture and Application of a Dynamically Reconfigurable Hardware Array for Future Mobile Communication Systems," Field Programmable Custom Computing Machines, 2000 IEEE Symposium, Napa Valley, Los Alamitos, CA. IEEE Comput. Soc. pp. 205-214 (Apr. 17-19, 2000).

Ashenden et al., "The VHDL Cookbook," Dept. Computer Science, University of Adelaide, South Australia. Downloaded from http://tams-www.informatik.uni-hamburg.de/vhdl/doc/cookbook/VHDL-Cookbook.pdf on Dec. 7, 2006 (Jul. 1990).

Bacon et al., "Compiler Transformations for High-Performance Computing," ACM Computing Surveys 26(4):368-373 (Dec. 1994).

Balasubramonian et al., "Reducing the Complexity of the Register File in Dynamic Superscalar Processors," Proceedings of the 34th Annual ACM/IEEE International Symposium on Microarchitecture, pp. 237-248 (Dec. 1, 2001).

Banerjee et al., "A MATLAB Compiler for Distributed, Heterogeneous, Reconfigurable Computing Systems," 2000 IEEE Symposium, pp. 39-48, (Apr. 17-19, 2000).

Bapte et al., "Uniform Execution Environment for Dynamic Reconfiguration," Darpa Adaptive Computing Systems, http://isis.vanderbilt.edu/publications/archive/babty_#_1999_Uniform_Ex.pdf, pp. 1-7 (1999).

Baumgarte et al., "PACT XPP—A Self-Reconfigurable Data Processing Architecture," NN www.pactcorp.com/sneu/download/ersa01.pdf; retrieved on Nov. 25, 2005 (Jun. 25, 2001).

Becker et al., "An Application-Tailored Dynamically Reconfigurable Hardware Architecture for Digital Baseband Processing," IEEE Conference Proceedings Article pp. 341-346 (Sep. 18, 2000).

Becker et al., "Design and Implementation of a Coarse-Grained Dynamically Reconfigurable Hardware Architecture," VLSI 2001, Proceedings IEEE Computer Soc. Workshhop, Piscataway, NJ, USA, pp. 41-46 (Apr. 19-20, 2001).

Bevstar, BevStar Bottled Water Model Advertisement *Automatic Merchandiser* at www.AMonline.com (2005).

Bevstar, BevStar Point of Use Water Model Advertisement *Automatic Merchandiser* at www.AMonline.com (2005).

Bishop & Loucks, "A Heterogeneous Environment for Hardware/Software Cosimulation," Proceedings of the 30th Annual Simulation Symposium, pp. 14-22 (Apr. 7-9, 1997).

Brakensiek et al., "Re-Configurable Multi-Standard Terminal for heterogeneous Networks," Radio and Wireless Conference, Rawcon 2002 IEEE. pp. 27-30 (2002).

Brown et al., "Quick PDA Data Exchange," PC Magazine pp. 1-3 (May 22, 2001).

Buck et al., "Ptolemy: A Framework for Simulating and Prototyping Heterogeneous Systems," International Journal of Computer Simulation 4:155-182 (Apr. 1994).

Burns et al., "A Dynamic Reconfiguration Run-Time System," Proceedings of the 5th Annual Symposium on Field-Programmable Custom Computing Machines, pp. 1 66-75 (Apr. 16, 1997).

Business Wire, "Whirlpool Internet-Enabled Appliances to Use Beeline Shopper Software Features," http://www.whirlpoocorp.com/news/releases/release.asp?rid=90 (Feb. 16, 2001).

Buttazzo et al., "Optimal Deadline Assignment for Scheduling Soft Aperiodic Tasks in Hard Real-Time Environments," Engineering of Complex Computer Systems, Proceedings of the Third IEEE International Conference on Como, pp. 39-48 (Sep. 8, 1997).

Callahan et al., "Adapting Software Pipelining for Reconfigurable Computing," in Proceedings of the International Conference on Compilers, Architectrue and Synthesis for Embedded Systmes p. 8, ACM (CASES '00, San Jose, CA) (Nov. 17-18, 2000).

Chapman & Mehrotra, "OpenMP and HPF: Integrating Two Paradigms," Proceedings of the 4th International Euro-Par Conference (Euro-Par'98), Springer-Verlag Heidelberg, Lecture Notes in Computer Science 1470:650-658 (1998).

Chen et al., "A Reconfigurable Multiprocessor IC for Rapid Prototyping of Algorithmic-Specific High-Speed DSP Data Paths," IEEE Journal of Solid-State Circuits, IEEE 35:74-75 (Feb. 1, 2001).

Clarke, "Embedded Solutions Enters Development Pact with Marconi," EETimes Online (Jan. 26, 2000).

Compton & Hauck, "Reconfigurable Computing: A Survey of Systems and Software," ACM Press, ACM Computing Surveys (CSUR) 34(2):171-210 (Jun. 2002).

Compton et al., "Configuration Relocation and Defragmentation for Run-Time Reconfigurable Computing," Northwestern University, http://citeseer.nj.nec.com/compton00configuration.html, pp. 1-17 (2000).

Conte et al., "Dynamic Rescheduling: A Technique for Object Code Compatibility in VLIW Architectures," Proceedings of the 28th Annulal International Symposium on Microarchitecture pp. 208-218 (Nov. 29, 1995).

Conte et al., "Instruction Fetch Mechanisms for VLIW Architectures with Compressed Encodings," Proceedings of the Annual IEEE/ACM International Symposium on Microarchitecture (MICRO) 29:201-211 (Dec. 2, 1996).

Cray Research Inc., "Cray T3E Fortran Optimization Guide," Ver. 004-2518-002, Section 4.5 (Jan. 1999).

Cummings et al., "FPGA in the Software Radio," IEEE Communications Magazine. 37(2):108-112 (Feb. 1999).

Dandalis et al., "An Adaptive Cryptograhic Engine for IPSec Architectures," IEEE pp. 132-141 (Jan. 2000).

David et al., "DART: A Dynamically Reconfigurable Architecture Dealing with Future Mobile Telecommunication Constraints," Proceedings of the International Parallel and Distributed Processing Symposium pp. 156-163 (Apr. 15, 2002).

Deepakumara et al., "FPGA Implementation of MD5 has Algorithm," Canadian Conference on Electrical and Computer Engineering, IEEE (2001).

Dehon et al., "Reconfigurable Computing: What, Why and Implications for Design Automation," Design Automation Conference Proceedings pp. 610-615 (1999).

Dipert, "Figuring Out Reconfigurable Logic," EDN 44(16):107-114 (Aug. 5, 1999).

Dominikus, "A Hardware Implementation of MD4-Family Hash Algorithms," 9th International Conference on Electronics, Circuits and Systems IEEE (2002).

Dorband, "aCe C Language Reference Guide," Online (Archived Mar. 2001), http://web.archive.org/web/20000616053819/http://newton.gsfc.nasa.gov/aCe/aCe_dir/aCe_cc_Ref.html (Mar. 2001).

Drozdowski, "Scheduling Multiprocessor Tasks—An Overview," Instytut Informatyki Politechnika, pp. 1-31 (Jan. 31, 1996).

Ebeling et al., "RaPiD Reconfigurable Pipelined Datapath," Springer-Verlag, 6th International Workshop on Field-Programmable Logic and Applications pp. 126-135 (1996).

Fawer et al., "A Multiprocessor Approach for Implementing a Time-Diversity Spread Spectrum Receiver," Proceeding sof the 1990 International Zurich Seminal on Digital Communications, pp. 173-180 (Mar. 5-8, 1990).

Fisher, "Gone Flat," Forbes pp. 76-79 (Oct. 2001).

Fleischmann et al., "Prototyping Networked Embedded Systems," Integrated Engineering, pp. 116-119 (Feb. 1999).

Forbes "Best of the Web—Computer Networking/Consumer Durables," *The Forbes Magnetic 40* p. 80 (May 2001).

Gibson, "Fresh Technologies Will Create Myriad Functions," FT Information Technology Review; World Wide Web at http://technews.acm.org/articles/2000-2/0301w.html?searchterm=%22fresh+technologies%22 (Mar. 1, 2000).

Gluth, "Integrierte Signalprozessoren," Elektronik 35(18):112-118 Franzis Verlag GMBH, Munich, Germany (Sep. 5, 1986).

Gokhale & Schlesinger,"A Data Parallel C and Its Platforms," Proceedings of the Fifth Symposium on the Frontiers of Massively Parallel Computation pp. 194-202 (Frontiers '95) (Feb. 1995).

Grimm et al., "A System Architecture for Pervasive Computing," Washington University, pp. 1-6 (Sep. 2000).

Halbwachs et al., "The Synchronous Data Flow Programming Language LUSTRE," Proceedings of the IEEE 79(9):1305-1319 (Sep. 1991).

Hammes et al., "Cameron: High Level Language Compilation for Reconfigurable Systems," Proc. of the Intl. Conf. on Parallel Architectures and Compilation Techniques, pp. 236-244 (Oct. 1999).

Hartenstein, "Coarse Grain Reconfigurable Architectures," Design Automation Conference, 2001. Proceedings of the ASP-Dac 2001, Asian and South Pacific Jan. 30, 2001-Feb. 2, 2001, Piscataway, Nj, US, IEEE, pp. 564-569 (Jan. 30, 2001).

Heinz, "An Efficiently Compilable Extension of {M}odula-3 for Problem-Oriented Explicitly Parallel Programming," Proceedings of the Joint Symposium on Parallel Processing (May 1993).

Hinden et al., "The DARPA Internet: Interconnecting Heterogeneous Computer Networks with Gateways," IEEE Computer Magazine pp. 38-48 (1983).

Horton, "Beginning Java 2: JDK 1.3 Edition," Wrox Press, Chapter 8, pp. 313-316 (Feb. 2001).

Huff et al., "Lifetime-Sensitive Modulo Scheduling," 6th Conference on Programming Lanugage, Design and Implementation, pp. 258-267, ACM (1993).

IBM, "Multisequencing a Single Instruction Stream Scheduling with Space-time Trade-offs," IBM Technical Disclosure Bulletin 36(2):105-108 (Feb. 1, 1993).

IEEE, "IEEE Standard Verilog Hardware Description Language," downloaded from http://inst.eecs.berkeley.edu/~cs150/fa06/Labs/verilog-ieee.pdf on Dec. 7, 2006 (Sep. 2001).

Internet Wire, Sunbeam Joins Microsoft in University Plug and Play Forum to Establish A "Universal" Smart Appliance Technology Standard (Mar. 23, 2000).

Ishii et al., "Parallel Variable Length Decoding with Inverse Quantization for Software MPEG-2 Decoders," Workshop on Signal Processing Systems, Design and Implementation, IEEE pp. 500-509 (Nov. 3-5, 1997).

Isoworth, "Isoworth Beverage Dispensing Technology Worldwide Company," Brochure (May 22, 2000).

Jain et al., "An Alternative Approach Towards the Design of Control Units," Microelectronics and Reliability 24(6):1009-1012 (1984).

Jain, "Parallel Processing with the TMS320C40 Parallel Digital Signal Processor," Sonitech International Inc. pp. 13-46. Retrieved from: http://www-s.ti.com/sc/psheets/spra031/spra031.pdf retrieved on Apr. 14, 2004 (Feb. 1994).

Janssen et al., "Partitioned Register File for TTAs," Proceedings of the 28th Annual International Symposium on Microarchitecture, pp. 303-312 (Nov. 1995).

Jong-Pyng et al., "Real-Time Virtual Channel Flow Control," Proceedings of the Annual International Phoenix Conference on Computers and Communications, Conf. 13, pp. 97-103 (Apr. 12, 1994).

Jung et al., "Efficient Hardware Controller Synthesis for Synchronous Dataflow Graph in System Level Design," Proceedings of the 13th International Symposium on System Synthesis pp. 79-84 (ISSS'00) (Sep. 2000).

Kaufmann et al., "Digital Spread-Spectrum Multipath-Diversity Receiver for Indoor Communication," from Pioneers to the 21st Century; Denver, Proceedings of the Vehicular Technology Socity [sic] Confernece, NY, IEEE, US 2(Conf. 42):1038-1041 (May 10-13, 1992).

Kneip et al., "An Algorithm Adapted Autonomous Controlling Concept for a Parallel Single-Chip Digital Signal Processor," Journal of VLSI Signal Processing Systems for Signal, Image, and dVideo Technology 16(1):31-40 (May 1, 1997).

Lee & Messerschmitt, "Pipeline Interleaved Programmable DSP's: Synchronous Data Flow Programming," IEEE Transactions on Acoustics, Speech, and Signal Processing ASSP-35(9):1334-1345 (Sep. 1987).

Lee & Messerschmitt, "Synchronous Data Flow," Proceedings of the IEEE 75(9):1235-1245 (Sep. 1987).

Lee & Parks, "Dataflow Process Networks," Proceedings of the IEEE 83(5):773-799 (May 1995).

Liu et al., "Scheduling Algorithms for Multiprogramming in a Hard-Real-Time Environment," *Journal of the Association for Computing* 20(1):46-61 (1973).

Llosa et al., "Lifetime-Sensitive Modulo Scheduling in a Production Environment," IEEE Trans. on Comps. 50(3):234-249 (Mar. 2001).

Lu et al., "The Morphosys Dynamically Reconfigurable System-On-Chip," Proceedings of the First NASA/DOD Workshop on Evolvable Hardware, pp. 152-160 (Jul. 19, 1999).

Mangione-Smith et al., "Seeking Solutions in Configurable Computing," *Computer* 30(12):38-43 (Dec. 1997).

Manion, "Network CPU Adds Spice," Electronic Engineering Times, Issue 1126 (Aug. 14, 2000).

Mascia & Ishii., "Neural Net Implementation in Single-Chip Digital Signal Processor," IEEE (1989).

McGraw, "Parallel Functional Programming in Sisal: Fictions, Facts, and Future," Lawrence Livermore National Laboratory pp. 1-40 (Jul. 1993).

Najjar et al., "High-Level Language Abstraction for Reconfigurable Computing," *Computer* 36(8):63-69 (Aug. 2003).

Nichols et al., "Data Management and Control-Flow Constructs in a SIMD/SPMD Parallel Language/Compiler," Proceedings of the 3rd Symposium on the Frontiers of massively Parallel Computation pp. 397-406 (Oct. 1990).

OpenMP Architecture Review Board, "OpenMP C and C++ Application Program Interface," pp. 7-16 (Oct. 1998).

Oracle Corporation, "Oracle8i JDBC Developer's Guide and Reference," Release 3, 8.1.7, pp. 10-8-10-10 (Jul. 2000).

Pauer et al., "Algorithm Analysis and Mapping Environment for Adaptive Computing Systems: Further Results," Proc. IEEE Symposium on FPGA's for Custom Computing Machines (FCCM), Napa CA (1999).

Pauer et al., "Algorithm Analysis and Mapping Environment for Adaptive Computing Systems," Presentation slides, Third Bi-annual Ptolemy Miniconference (1999).

Ramamritham et al., "On Scheduling Algorithms for Real-Time Multiprocessor Systems," Algorithms and Applications, Proceedings of the International conference on Parallel Processing 3:143-152 (Aug. 8, 1989).

Schneider, "A Parallel/Serial Trade-Off Methodology for Look-Up Table Based Decoders," Proceedings of the Design Automation Conference 34:498-503 (Jun. 9-13, 1997).

Sidhu et al., "A Self-Reconfigurable Gate Array Architecture," 10 International Workshop on Field Programmable Logic and Applications http://coblitz.codeen.org:3125/citeseer.ist.psu.edu/cache/papers/cs/17524/http:zSzzSzmaarcii.usc.eduzSzPublicationsZSzsidhu__fp100.pdf/sidhu00selfreconfigurable.pdf retrieved on Jun. 21, 2006 (Sep. 1, 2001).

Smith, "Intro to Asics: ASIC Cell Libraries," at http://iroi.seu.edu.cn/books/asics/Book2/CH01/CH01.5.htm, printed on Feb. 4, 2005 (Jun. 1997).

Souza, "Computing's New Face—Reconfigurable Devices Could Rattle Supply Chain," Electronic Buyers' News Issue 1205, p. 1 (Apr. 3, 2000).

Souza, "Quicksilver Buys White Eagle," Electronic Buyers News, Issue 1220 (Jul. 17, 2000).

Sriram et al., "MPEG-2 Video Decoding on the TMS320C6X DSP Architecture," Conference Record of the 32nd Asilomar Conference on Signals, Systems, and Computers, IEEE pp. 1735-1739 (Nov. 1-4, 1998).

Steiner, "Coke Chief's Latest Daft Idea—A Cola Tap in Every House," Sunday Times (Mar. 2001).

Sun Microsystems, "Fortran 3.0.1 User's Guide, Revision A," pp. 57-68 (Aug. 1994).

Svensson, "Co's Join On Home Web Wiring Network," Associated Press Online printed on Apr. 30, 2008 (Jun. 2000).

Tang et al., "Thread Partitioning and Scheduling Based on Cost Model," Proceedings of the Ninth Annual ACM Symposium on Parallel Algorithms and Architectures, pp. 272-281 Retrieved from: http://doi.acm.org/10.1145/258492.2585 retrieved on Aug. 25, 2004 (1997).

Vaya, "VITURBHO: A Reconfigurable Architecture for Ubiquitous Wireless Networks," A Thesis Submitted in Partial Fulfillment of the Requirements for the Degree Master of Science; RICE University (Aug. 2002).

Wang et al., "Cell Search in W-CDMA," IEEE Journal on Selected Areas in Communications 18(8):1470-1482 (Aug. 2000).

Wardell, "Help for Hurried Cooks?," Popular Science, p. 32 (May 2000).

Whiting & Pascoe, "A History of Data-Flow Languages," IEEE Annals of the History of Computing 16(4):38-59 (1994).

Williamson & Lee, "Synthesis of Parallel Hardware Implementations from Synchronous Dataflow Graph Specifications," Conference Record of the Thirtieth Asilomar Conference on Signals, Systems and Computers 1340-1343 (Nov. 1996).

Wirthlin et al., "A Dynamic Instruction Set Computer," Proceedings of the IEEE Symposium on FPGA's for Custom Computing Machines, pp. 99-107 (Apr. 21, 1995).

WWW.APPLIANCEMAGAZINE.COM, World Wide Web at http://web.archive.org/web/20000511085402/http://www.appliancemagazine.com/ printed on Apr. 30, 2008.

WWW.BESTROM.COM, BreakmateTM from www.bestrom.com printed on Apr. 29, 2008.

WWW.BEVERAGEEXPRESS.COM, Beverage Express from www.beverageexpress.com printed on Apr. 30, 2008.

WWW.BEVSTAR.COM, Isoworth Beverage Dispensing Technology Worldwide from www.bevstar.com printed on Apr. 30, 2008.

WWW.BONATOR.COM, from The World Wide Web at http://web.archive.org/web/20000510102440/http://www.nonator.com/ printed on Apr. 30, 2008.

WWW.ECOMMERCE.DEWPOINTINC.COM, Swiss Mountain Coffees from www.ecommerce.dewpointinc.com printed on Apr. 30, 2008.

WWW.GATEWAY.COM, World Wide Web, http://web.archive.org/web/20000229192734/www.gateway.com/productpages/9300splash/index.shtml Available on Mar. 3, 2000, 1 page (Mar. 3, 2000).

WWW.ICL.COM, from the World Wide Web at http://www.icl.com printed on Apr. 30, 2008.

WWW.MARCHERITA2000.COM; from Margherita2000.com printed Apr. 30, 2008 (Jan. 26, 2001).

WWW.SODACLUBENTERPRISES.COM, Soda-Club Enterprises from www.sodaclubenterprises.com printed on Apr. 30, 2008.

WWW.SYMBOL.COM, Smybol from www.symbol.com printed on Apr. 30, 2008.

WWW.WUNDERBAR.COM, Wunder-Bar Dispensing Systems from www.wunderbar.com printed on Apr. 30, 2008.

Xilinx, "Virtex-II Pro Platform FPGAs: Functional Description DS083-2 (v2.5)," Product Specification, pp. 13-46 (Jan. 20, 2003).

Young, "Architecture Powers up IPSec, SSL," EETimes, Los Gatos, CA, pp. 1-4 http://www.eetimes.com/story/OEG20011102S0065 (Nov. 2, 2001).

Yuan et al., "A Decomposition Approach to Non-Preemptive Real-Time Scheduling," Real Time Systems 6(1):7-35 (1994).

Zaino et al., "Algorithm Analysis and Mapping Environment for Adaptive Computing Systems," Final Technical Report, DARPA Contract F33615-97-C-1174 (Sep. 2001).

Zhang et al., "A IV Heterogeneous Reconfigurable Processor IC for Baseband Wireless Applications," 2000 IEEE Solid.

* cited by examiner

SHA-1 Pico Code Format

| 15 14 13 | 12 | 8 7 6 | 5 4 | 3 | 2 | 1 | 0 |
|---|---|---|---|---|---|---|---|
| Reserved / Mem WE | Memory Address | Shift Control | ALU Function | ALU Mux | R1 Mux | R2 CE | R1 CE |
| NO / YES | | 0 / 1 / 5 / 30 | OR / AND / XOR / SUM | R2 / MEM | ALU / MEM | NO / YES | NO / YES |

FIG. 3

SHA-1 Memory Map

| $a_2$ | $a_1$ | $a_0$ | $a_4=0; a_3=0$ | $a_4=0; a_3=1$ | $a_4=1; a_3=0$ | $a_4=1; a_3=1$ |
|---|---|---|---|---|---|---|
| 0 | 0 | 0 | $W_0$ | $W_8$ | a | $H_0$ |
| 0 | 0 | 1 | $W_1$ | $W_9$ | b | $H_1$ |
| 0 | 1 | 0 | $W_2$ | $W_{10}$ | c | $H_2$ |
| 0 | 1 | 1 | $W_3$ | $W_{11}$ | d | $H_3$ |
| 1 | 0 | 0 | $W_4$ | $W_{12}$ | e | $H_4$ |
| 1 | 0 | 1 | $W_5$ | $W_{13}$ | X | X |
| 1 | 1 | 0 | $W_6$ | $W_{14}$ | $K_0$ | $K_2$ |
| 1 | 1 | 1 | $W_7$ | $W_{15}$ | $K_1$ | $K_3$ |

FIG. 4

Pico Codes for Memory Address Generation

| Bits[12:8] | Value | Bits[12:8] | Value | Bits[12:8] | Value | Bits[12:8] | Value |
|---|---|---|---|---|---|---|---|
| 00000 | | 01000 | $W_t = W_{t-16}$ | 10000 | K | 11000 | $H_0$ |
| 00001 | | 01001 | $W_{t-8}$ | 10001 | a | 11001 | $H_1$ |
| 00010 | | 01010 | $W_{t-14}$ | 10010 | b | 11010 | $H_2$ |
| 00011 | | 01011 | $W_{t-3}$ | 10011 | c | 11011 | $H_3$ |
| 00100 | | 01100 | | 10100 | d | 11100 | $H_4$ |
| 00101 | | 01101 | | 10101 | e | 11101 | |
| 00110 | | 01110 | | 10110 | b/d | 11110 | |
| 00111 | | 01111 | | 10111 | d/b | 11111 | |

HARDWARE IMPLEMENTATION OF THE SECURE HASH STANDARD

CROSS-REFERENCES TO RELATED APPLICATION(S)

The present application is a continuation-in-part application of U.S. patent application Ser. No. 09/815,122, now U.S. Pat. No. 6,836,839, entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS," filed on Mar. 22, 2001, the disclosure of which is hereby incorporated by reference in their entirety as if set forth in full herein for all purposes.

BACKGROUND OF THE INVENTION

The present invention generally relates to the secure hash standard. More specifically, the present invention relates to a method and system for implementing a secure hash algorithm (SHA-1) specified by the secure hash standard with hardware resources.

The SHA-1 generally operates as follows. The SHA-1 takes as input a message of maximum length which is less than $2^{64}$ bits. The message is padded, if necessary, to render the total message length a multiple of 512. The message is then converted into 512-bit blocks. The 512-bit blocks are processed sequentially and the cumulative results represent a 160-bit message digest.

The SHA-1 performs eighty rounds of processing for each 512-bit block. For each of four groups of twenty rounds, the SHA-1 uses one of four Boolean functions and one of four constant values, to be further described below. Once all eighty processing rounds are completed, five 32-bit intermediate variables are updated. The process is then repeated for the next 512-bit block. Once all the 512-bit blocks are processed, the final, cumulative values of the five intermediate variables represent the 160-bit message digest. The details with respect to the processing of the 512-bit blocks will be further described below.

As mentioned above, the SHA-1 converts the message into 512-bit blocks and then processes the 512-bit blocks one at a time. More specifically, each 512-bit block to be processed is divided into sixteen (16) longwords $W_0, W_1, \ldots, W_{15}$, where $W_0$ is the leftmost longword. Each longword is thirty-two (32) bits in length. The SHA-1 uses a five longword circular buffer to maintain the five 32-bit intermediate variables, a, b, c, d and e.

Prior to processing the first 512-bit block, the intermediate variables are initialized with the constant values $H_0$ through $H_4$ (in hex) respectively as follows:

$a = H_0 = 0x67452301$ $b = H_1 = 0xEFCDAB89$ $c = H_2 = 0x98BADCFE$ $d = H_3 = 0x10325476$ $e = H_4 = 0xC3D2E1F0$

After the intermediate variables are initialized, the processing of the 512-bit blocks takes place as follows:

For t=16 to 79, let $W_t = S^1(W_{t-3} \text{ XOR } W_{t-8} \text{ XOR } W_{t-14} \text{ XOR } W_{t-16})$, where $S^k(\ )$ represents a k-bit circular left shift.

The eighty (80) rounds of processing for each 512-bit block are executed according to the following equations:

For t=0 to 79 do $a = \text{TEMP} = S^5(a) + f_t(b, c, d) + e + W_t + K_t$ $b = a$ $c = S^{30}(b)$ $d = c$ $e = d$ where "+" represents addition modulo $2^{32}$.

The function $f_t(b, c, d)$ and the constant $K_t$ vary during the eighty (80) rounds of processing as follows:

| | |
|---|---|
| $f_t(b,c,d) = (b \text{ AND } c) \text{ OR } (\text{NOT } b \text{ AND } d),$ | for (t = 0 to 19); |
| $f_t(b,c,d) = b \text{ XOR } c \text{ XOR } d,$ | for (t = 20 to 39); |
| $f_t(b,c,d) = (b \text{ AND } c) \text{ OR } (b \text{ AND } d) \text{ OR } (c \text{ AND } d),$ | for (t = 40 to 59); |
| $f_t(b,c,d) = b \text{ XOR } c \text{ XOR } d,$ | for (t = 60 to 79) |
| $K_t = 2^{32} \times (2^{1/2}/4) = 0x5A827999$ | for (t = 0 to 19); |
| $K_t = 2^{32} \times (3^{1/2}/4) = 0x6ED9EBA1$ | for (t = 20 to 39); |
| $K_t = 2^{32} \times (5^{1/2}/4) = 0x8F1BBCDC$ | for (t = 40 to 59); |
| $K_t = 2^{32} \times (10^{1/2}/4) = 0xCA62C1D6$ | for (t = 60 to 79) |

After the eighty (80) rounds of processing (t=0 to 79) are completed, i.e., after a 512-bit block is processed, the intermediate variables a, b, c, d and e are updated as follows:

$a = a + H_0$ $b = b + H_1$ $c = c + H_2$ $d = d + H_3$ $e = e + H_4$

After processing the last 512-bit block, the message digest is the 160-bit string represented by the five (5) longwords, a, b, c, d and e. The foregoing is a brief description of the SHA-1. Details with respect to the operations of the SHA-1 are well understood.

The SHA-1 is typically implemented using software. A person of ordinary skill in the art will know how to implement the SHA-1 using software. Using software to implement the SHA-1, however, has a number of shortcomings. For example, it is relatively easy to break into a software program designed to implement the SHA-1 thereby revealing that the SHA-1 is used for encrypting messages. By ascertaining the type of encryption algorithm that is being used to encrypt messages, a hacker may then successfully decrypt the message digests to obtain the messages. Hence, it would be desirable to provide a method and system that is capable of offering more secure implementation of the SHA-1.

SUMMARY OF THE INVENTION

According to one exemplary embodiment of the present invention, an integrated circuit for implementing the secure hash algorithm is provided. According to this exemplary embodiment, the integrated circuit includes a data path and a controller controlling operation of the data path. The data path is capable of handling each round of processing reiteratively. In one implementation, the data path includes a data multiplexor, an address multiplexor, a memory, a first processing multiplexor, a second processing multiplexor, a first register, a second register, a shifter and an arithmetic logic unit. By coupling these various components of the data path, as further described below, the data path can be used to execute the secure hash algorithm in a reiterative manner.

In another implementation, the controller includes an address control module and a finite state machine. The address control module further includes a pico code ROM and a number of counters. The address control module uses a pico code memory address, the state of the finite state machine and various counter bits to generate a physical memory address and appropriate control bits to control the operation of the data path.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

The present invention in the form of one or more exemplary embodiments is now described. According to an exemplary embodiment of the present invention, an integrated circuit is provided to implement the Secure Hash Algorithm (SHA-1) specified by the Secure Hash Standard as promulgated by the National Institute of Standards and Technology.

The parallelizability of the SHA-1 allows a continuum of hardware implementations that trade performance and hardware complexity. Assume that performance/throughout is represented by the following equation:

Throughput=$(512 \times f_{max})/(81 \times m)$ bits per second where $f_{max}$ represents the maximum clock frequency, 81 represents 80 processing rounds plus one update round, and m represents the number of clock periods required for each processing round.

In one implementation where m=16 and $f_{max}$=100 MHz, the resulting performance is calculated to be 39.5 Mb/s or 4.94 MB/s, or approximately five (5) kilobytes per millisecond. Experimentally, it has been determined that the 5 MB/s implementation requires approximately 1500 gates, 128 bytes of RAM and 132 bytes of ROM. In another implementation having an approximate order of magnitude increase in hardware for an m=1 and $f_{max}$=100 MHz, a performance of 79 MB/s, or 79 kilobytes per millisecond is achieved.

Figure 1:
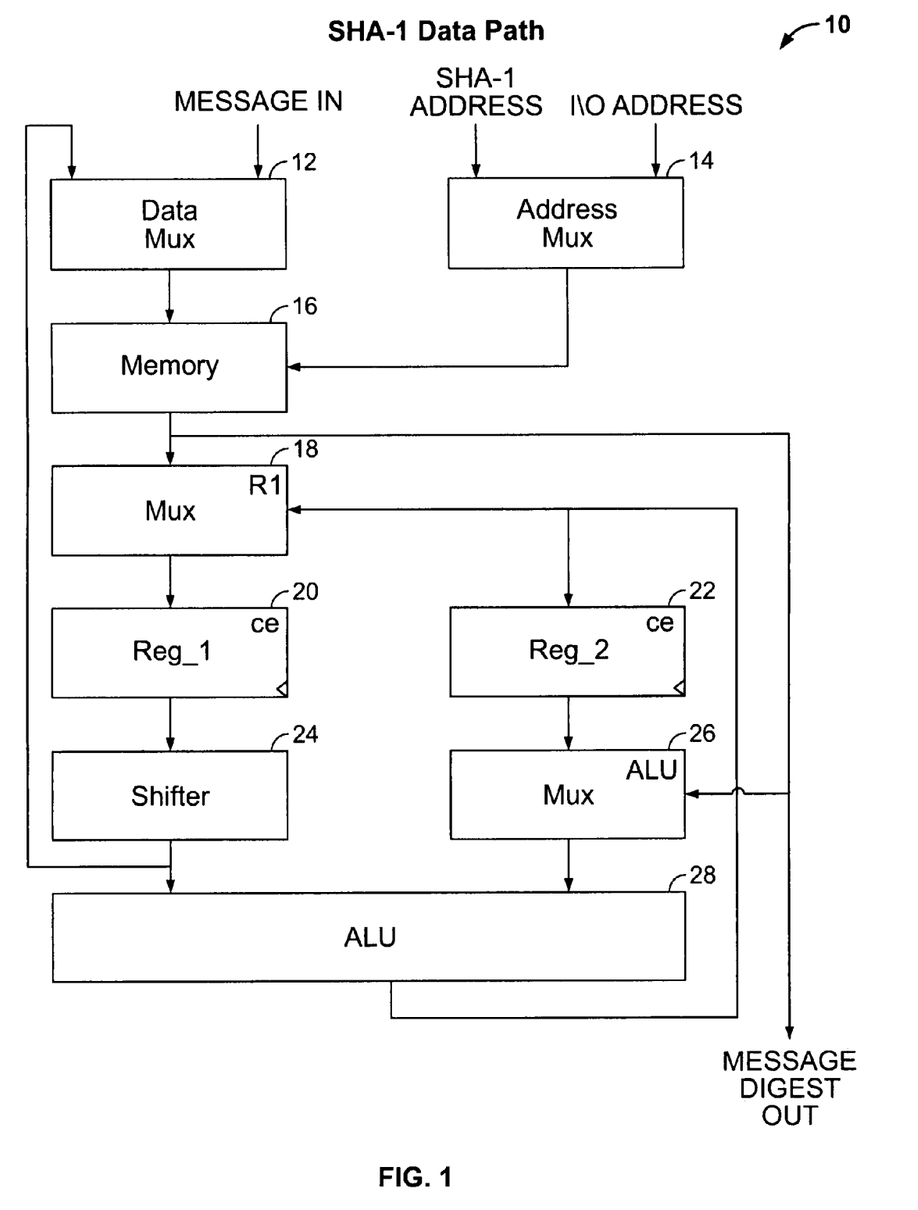
FIG. 1 is a simplified block diagram illustrating an exemplary embodiment of a data path for data processed pursuant to the SHA-1 in accordance with the present invention.

FIG. 1 is a simplified block diagram illustrating the data path of data processed pursuant to the SHA-1 in accordance with the present invention. As shown in FIG. 1, the data path 10 includes a data multiplexor 12, an address multiplexor 14, a memory 16, a first processing multiplexor 18, a first register 20, a second register 22, a shifter 24, a second processing multiplexor 26 and an arithmetic logic unit 28. More specifically, the data multiplexor 12 and the address multiplexor 14 are coupled to the memory 16 to control the output of the memory 16. The output from the memory 16, in turn, is coupled to the first and second processing multiplexors 18, 26. In addition, the first processing multiplexor 18 also receives the output of the arithmetic logic unit 28. The output of the first processing multiplexor 18 is coupled to the first register 20. The output of the first register 20 is coupled to the shifter 24. The output of the shifter 24 is provided to both the arithmetic logic unit 28 and the data multiplexor 12. Furthermore, the output of the arithmetic logic unit 28 is also fed to the second register 22. The output of the second register 22 is coupled to the second processing multiplexor 26. The output of the second processing multiplexor 26 is provided to the arithmetic logic unit 28. It should be noted that the data path 10 does not address issues such as messaging padding, endianness, input/output etc. A person of ordinary skill in the art will be able to address these issues.

Figure 2:
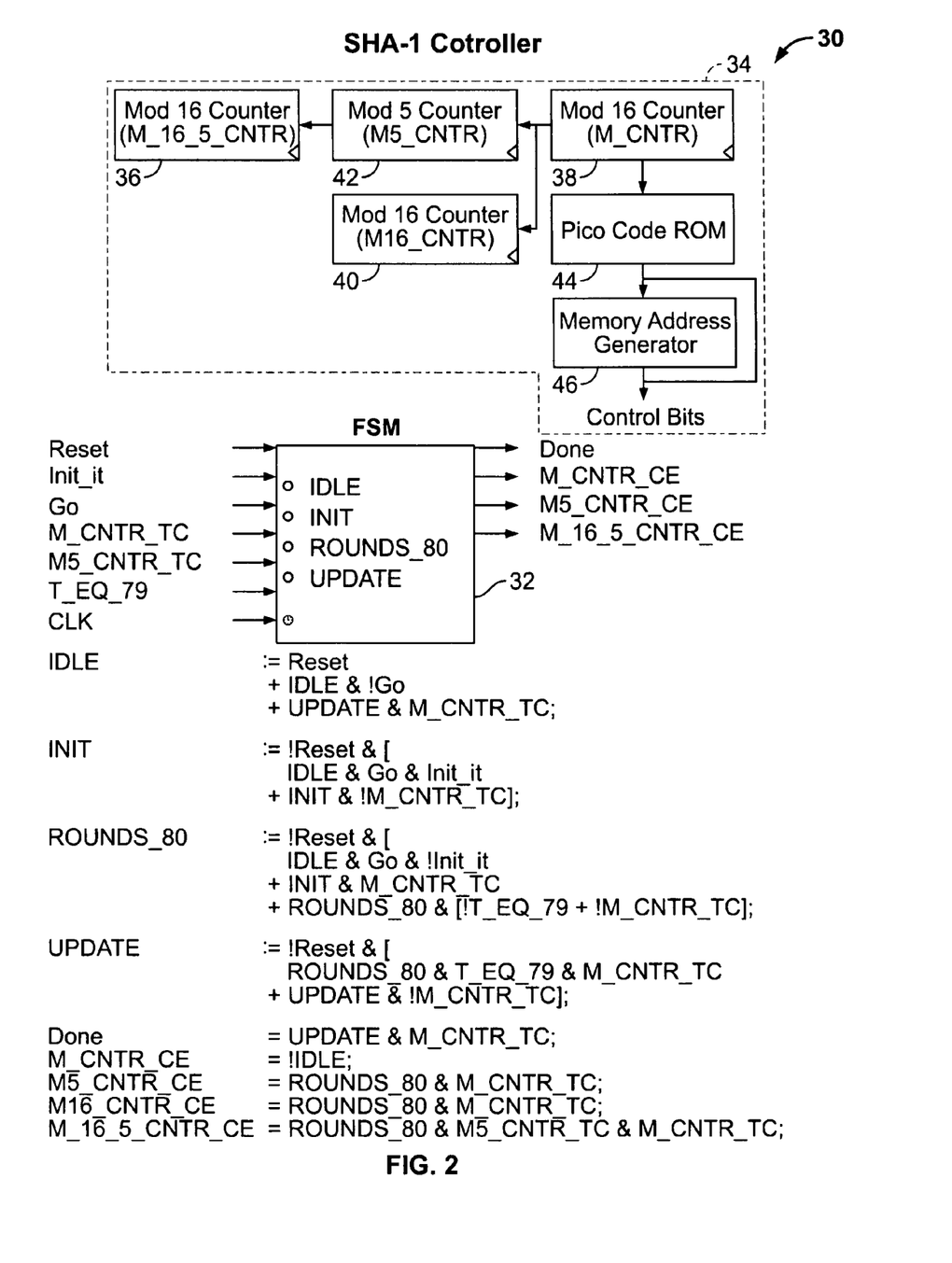
FIG. 2 is a simplified block diagram illustrating an exemplary embodiment of a controller used to control operation of the data path shown in FIG. 1 in accordance with the present invention.

In an exemplary embodiment, the data path 10 shown in FIG. 1 is controlled by a controller. An exemplary embodiment of the controller is shown in FIG. 2. As shown in FIG. 2, the controller 30 includes a finite state machine 32 and an address control module 34. The finite state machine 32 functions in cooperation with the address control module 34 to control the data path 10. Furthermore, in one exemplary embodiment, the address control module 34 is comprised of a number of components, including a first mod-16 counter 36, a second mod-16 counter 38, a third mod-16 counter 40, a mod-5 counter 42, a ROM 44 and a memory address generator 46. The output of the second mod-16 counter 38 is coupled to the third mod-16 counter 40, the mod-5 counter 42 and the ROM 44. The output of the mod-5 counter 42 is provided to the first mod-16 counter 36. The ROM 44 is coupled to the memory address generator 46. Finally, the respective outputs of the ROM 44 and the memory address generator 46 are provided to the data path 10.

The finite state machine 32 is capable of assuming a number of states. In the exemplary embodiment shown in FIG. 2, the finite state machine 32 can assume one of four (4) different states. The inputs, outputs and respective logic conditions that produce the different states for the finite state machine 32 are shown in FIG. 2.

Figure 3:
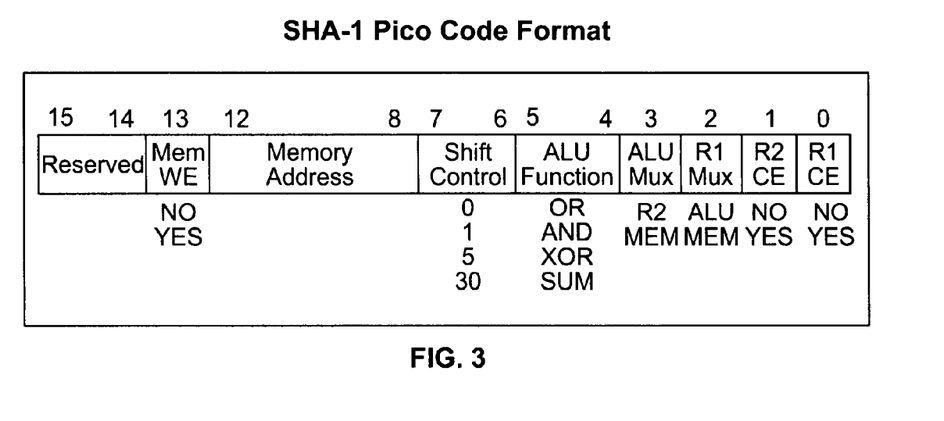
FIG. 3 is an illustrative diagram showing an exemplary embodiment of a data structure used to store data for controlling operation of the controller and the data path in accordance with the present invention.

According to an exemplary embodiment, the data stored within the ROM 44 is organized in a pico code format. FIG. 3 shows an exemplary embodiment of the Pico code format. The data stored within the ROM 44 is used to control operation of the controller and the data path 10. More specifically, the ROM 44 contains a number of pico codes. Each pico code is designed to direct the controller and the data path 10 to perform a specific operation. As shown in FIG. 3, each Pico code has a length of sixteen (16) bits. Bits (0-7) and (13) are used to control the operation of the various components of the data path 10. For example, bits (0) and (1) are respectively used to control the first and second registers 20, 22; bits (2) and (3) are respectively used to control the first and second processing multiplexor 18, 26; bits (4) and (5) are used to control the arithmetic logic unit 28; bits (6) and (7) are used to control the shifter (24); bits (8-12) are used to represent the pico code memory address which is then used to generate the physical memory address for accessing the memory 16; and bit (13) is used to control the type of operation to be performed in the memory 16.

Figure 4:
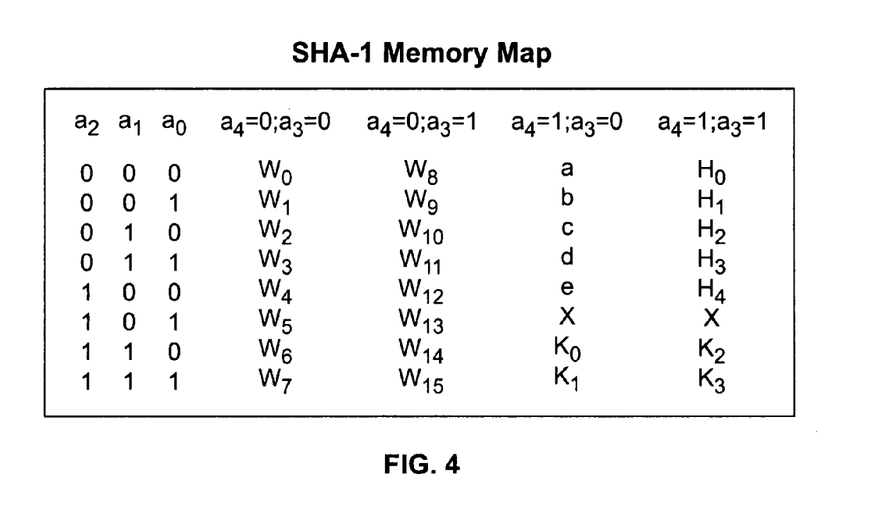
FIG. 4 is an illustrative diagram showing an exemplary embodiment of a memory map in accordance with the present invention.

The memory 16 is organized based on a memory map. FIG. 4 shows an exemplary embodiment of the memory map. Referring to FIG. 4, the physical memory address, A[4:0], is five (5) bits in length. The use of the 5-bit physical memory address means that there are thirty-two (32) addressable words in the memory 16. Each word is preferably sixteen (16) bits in length. The thirty-two (32) words are used to represent the variables that are needed to carry out the SHA-1. For example, some of the thirty-two (32) available words may be used to represent the sixteen (16) longwords that are used for each of the eighty (80) rounds of SHA-1 processing, the five (5) intermediate variables (a, b, c, d and e), the five (5) initialization values ($H_0$-$H_4$), and the four (4) processing constants ($K_{t=0-19}$, $K_{t=20-39}$, $K_{t=40-59}$ and $K_{t=60-79}$).

Figure 5:
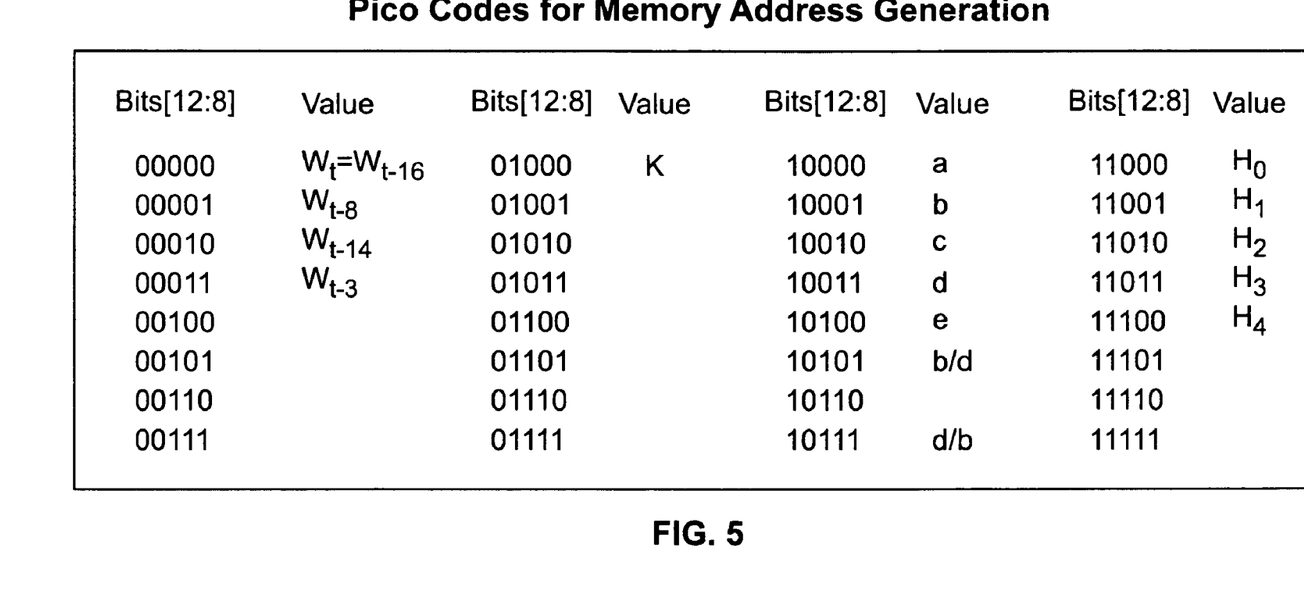
FIG. 5 is an illustrative diagram showing an exemplary embodiment of pico code for memory address generation in accordance with the present invention.

As mentioned above, the pico code memory address is used to generate the physical memory address for accessing the memory 16. Generally, the physical memory address is generated from the pico code memory address, the state of the finite state machine 32, and various counter bits from the second mod-16 counter 38. FIG. 5 shows an exemplary embodiment of the pico code memory address used for generating the physical memory address to access the memory 16.

The physical memory address, A[4:0], used to access the memory 16 is generated from the pico code memory address in the following manner. When the pico code memory address bits [12-11] are "00", A[4] is set to "0" and A[3:0] is determined as follows:

(constant+t(mod 16)) mod 16, where the constant is:

| pico code memory address bits | [8] | [9] | constant |
|---|---|---|---|
| | 0 | 0 | 0x0 |
| | 0 | 1 | 0x8 |
| | 1 | 0 | 0x2 |
| | 1 | 1 | 0xD |

When the pico code memory address bits [12-11] are "01", A[4], A[2] and A[1] are set to "1". A[3] is set as follows: if [t>=40], then A[3] is set to "1", else A[3] is set to "0". A[0] is set as follows: if ([20<=t<=39] OR [t>=60]), then A[0] is set to "1", else A[0] is set to "0".

When the pico code memory address bits [12-11] are "10", A[4] is set to "1" and A[3] is set to "0". A[2:0] are set as follows using the state of the finite state machine 32 and the pico code memory address bits [10-8]:

```
if ([FSM_STATE = INIT] OR [FSM_STATE =
UPDATE]) then A[2:0] = bits [10–8] else
    if ([bits[10–8] = "101"] AND [t<20])      then A[2:0] =
                                              ("001" –
                                              t[mod5]) mod 5
    elseif ([bits[10–8] = "101"] AND [t>=20]) then A[2:0] =
                                              ("011" –
                                              t[mod5]) mod 5
    elseif ([bits[10–8] = "111"] AND [t<20])  then A[2:0] =
                                              ("011" –
                                              t[mod5]) mod 5
    elseif ([bits[10–8] = "111"] AND [t>=20]) then A[2:0] =
                                              ("001" –
                                              t[mod5]) mod 5
    else A[2:0] = (bits[10–8] – t[mod5]) mod 5
```

When the pico code memory address bits [12-11] are "11", then A[4:0] are set to the pico code memory address bits [12-8].

Figure 6A:
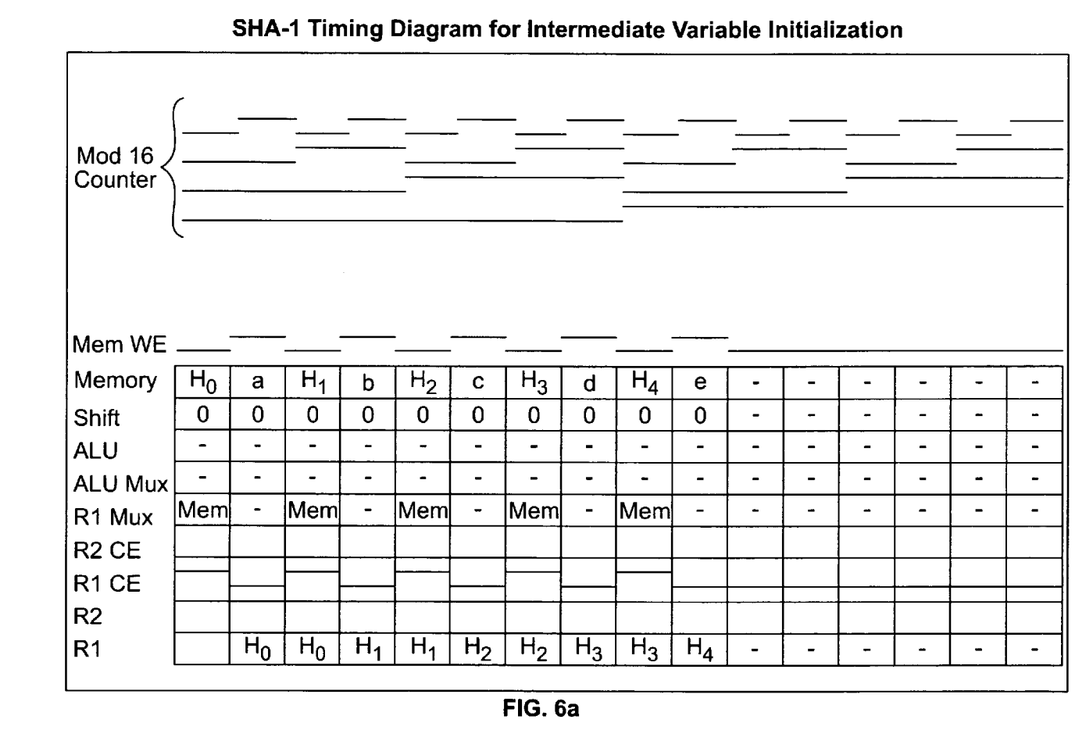
FIGS. 6a-c are selected illustrative timing diagrams showing operations of the respective components of the data path in accordance with the present invention.
Figure 6B:
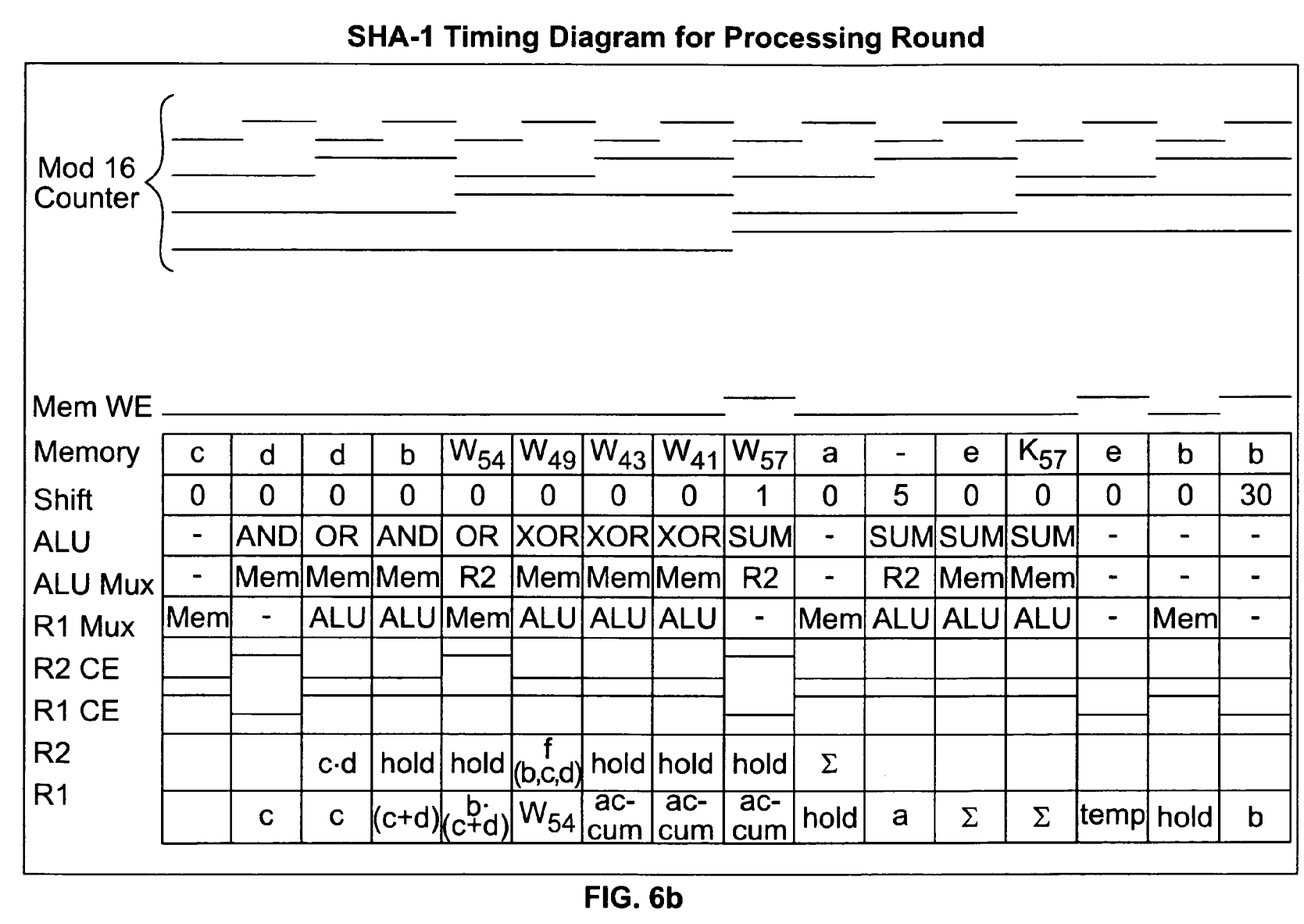
Figure 6C:
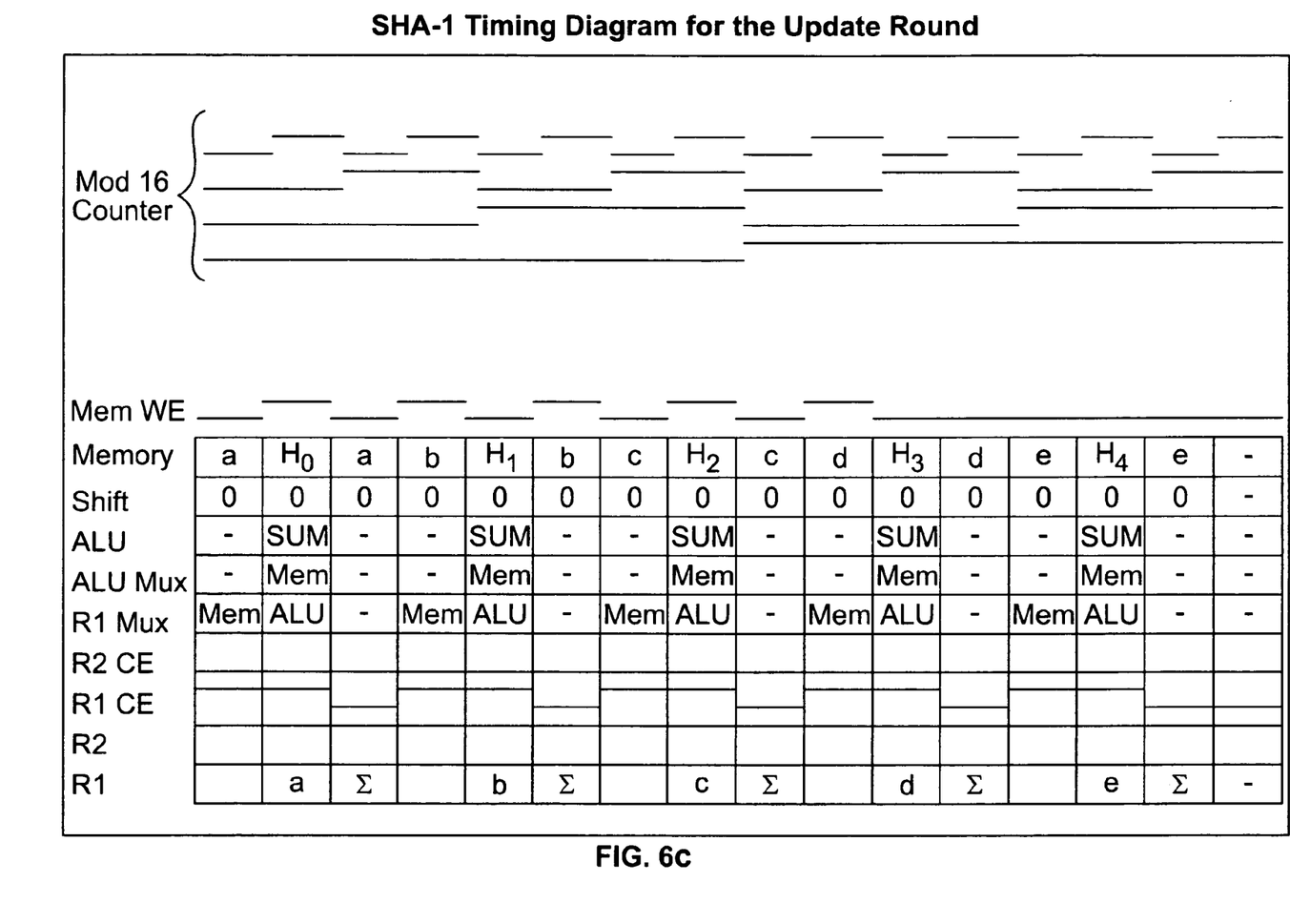

Operations of the data path 10 are illustrated by a number of selected timing diagrams. FIGS. 6*a-c* are selected illustrative timing diagrams showing operations of the respective components of the data path 10. More specifically, FIG. 6*a* is a timing diagram illustrating the operation of various components of the data path 10 when initializing the intermediate variables (a, b, c, d and e) with the initialization constants ($H_0$-$H_4$); FIG. 6*b* is a timing diagram illustrating the operation of various components of the data path 10 for one round (round t=57) of SHA-1 processing; and FIG. 6*c* is a timing diagram illustrating the operation of various components of the data path 10 for the intermediate variable update round.

In an exemplary embodiment, the data path 10 and the controller including the finite state machine 32 and the address control module 34 are implemented as part of an integrated circuit using hardware. The integrated circuit can be embedded in a mobile communication device, such as a mobile phone, where encryption and decryption functions are desired for security purposes. Furthermore, the data path 10 and the controller can be implemented using reconfigurable hardware resources within an adaptive computing architecture. Details relating to the adaptive computing architecture and how reconfigurable hardware resources are used to implement functions on an on-demand basis are disclosed in U.S. patent application Ser. No. 09/815,122 entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS," filed on Mar. 22, 2001, the disclosure of which is hereby incorporated by reference in their entirety as if set forth in full herein for all purposes. Based on the disclosure provided herein, it will be appreciated by a person of ordinary skill in the art that the present invention can be implemented using hardware in various different manners.

It should also be understood that based on the disclosure provided herein, it will be appreciated by a person of ordinary skill in the art that minor modifications can be made to the present invention to accommodate and implement a number of other encryption/decryption algorithms.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. An integrated circuit for implementing a secure hash algorithm, comprising:
    a data path configured to process an input message by performing rounds of the secure hash algorithm, the data path comprising hardware components that are reconfigurable; and
    a controller configured to control operation of the data path in performing the rounds of the secure hash algorithm, the controller comprising hardware components including an address control module and a finite state machine that cooperate with each other to provide control bits and physical memory addresses during each round of the secure hash algorithm;

wherein at least some of the hardware components of the data path are reconfigured during each round of the secure hash algorithm in response to the control bits provided during each round of the secure hash algorithm; and wherein variable values stored in a variable memory are provided to the data path for processing during each round of the secure hash algorithm in response to the physical memory addresses provided during each round of the secure hash algorithm.

2. The integrated circuit of claim 1 wherein the control bits and the physical memory addresses are provided during each round of the secure hash algorithm to enable the data path to perform reiterative processing of each round of the secure hash algorithm.

3. The integrated circuit of claim 1 wherein the address control module includes:
   a code memory configured to store codes that are used to direct performance of each round of the secure hash algorithm, the codes comprising the control bits provided during each round of the secure hash algorithm and address information for generating the physical memory addresses provided during each round of the secure hash algorithm.

4. The integrated circuit of claim 3 wherein the variables include longwords, intermediate variables, initialization constants, and processing constants.

5. The integrated circuit of claim 3 wherein the address control module further includes:
   a modulo counter configured to fetch the codes in the code memory that are used to direct performance of each round of the secure hash algorithm; and
   an address generator configured to generate the physical memory addresses based on the address information in the codes that are used to direct performance of each round of the secure hash algorithm.

6. The integrated circuit of claim 5 wherein:
   the finite state machine provides state information regarding the state of the implementation of the secure hash algorithm; and
   the address generator generates the physical memory addresses during each round of the secure hash algorithm further based upon the state information provided by the finite state machine.

7. The integrated circuit of claim 1 wherein:
   the finite state machine provides state information regarding the state of the secure hash algorithm; and
   the address control module provides the control bits and the physical memory addresses during each round of the secure hash algorithm based upon the state information provided by the finite state machine.

8. The integrated circuit of claim 1 wherein the integrated circuit further comprises the variable memory.

9. A network communication device having the integrated circuit of claim 1.

10. An integrated circuit for implementing a secure hash algorithm with multiple rounds, comprising:
    a data path circuit comprising the following hardware components:
      a variable memory;
      a first multiplexor coupled to the variable memory;
      a first register coupled to the first multiplexor;
      a shifter coupled to the first register;
      an arithmetic logic unit coupled to the shifter and the first multiplexor;
      a second register coupled to the arithmetic logic unit; and
      a second multiplexor coupled to the second register, the variable memory and the arithmetic logic unit; and
    a controller configured to control operation of the data path circuit, comprising:
      a finite state machine; and
      an address control module operable in conjunction with the finite state machine to generate physical memory addresses and control bits during each round of the secure hash algorithm:
    wherein at least some of the hardware components of the data path circuit are reconfigurable and are reconfigured during each round of the secure hash algorithm in response to the control bits provided during each round of the secure hash algorithm; and
    wherein the variable memory provides variable values during each round of the secure hash algorithm for processing by others of the hardware components of the data path circuit in response to the physical memory addresses provided during each round of the secure hash algorithm.

11. The integrated circuit of claim 10 wherein the address control module further includes:
    a code memory configured to store codes that are used to direct performance of each round of the secure hash algorithm, the codes comprising the control bits provided during each round of the secure hash algorithm and address information for generating the physical memory addresses provided during each round of the secure hash algorithm.

12. The integrated circuit of claim 11 wherein the address control module further includes:
    a modulo counter configured to fetch the codes in the code memory that are used to direct performance of each round of the secure hash algorithm; and
    an address generator configured to generate the physical memory addresses based on the address information in the codes that are used to direct performance of each round of the secure hash algorithm.

13. The integrated circuit of claim 12 wherein:
    the finite state machine provides state information regarding the state of the implementation of the secure hash algorithm; and
    the address generator generates the physical memory addresses during each round of the secure hash algorithm further based upon the state information provided by the finite state machine.

14. The integrated circuit of claim 10 wherein the variables include longwords, intermediate variables, initialization constants, and processing constants.

15. A communication device having the integrated circuit of claim 10.

16. The integrated circuit of claim 10 wherein the control bits and the physical memory addresses are provided during each round of the secure hash algorithm to enable the data path circuit to perform reiterative processing of each round of the secure hash algorithm.

17. The integrated circuit of claim 10 wherein:
    the finite state machine provides state information regarding the state of the secure hash algorithm; and
    the address control module provides the control bits and the physical memory addresses during each round of the secure hash algorithm based upon the state information provided by the finite state machine.

18. A method of implementing multiple rounds of a secure hash algorithm, the method comprising:
    configuring a reconfigurable hardware data path to process an input message by performing rounds of the secure hash algorithm, the data path comprising hardware components that are reconfigurable; and configuring a reconfigurable hardware controller including a finite state machine to control operation of the data path during each round, and an address control module, the address control module and the finite state machine cooperating with each other to provide control bits and physical memory addresses during each round of the secure hash algorithm;

wherein at least some of the hardware components of the data path are reconfigured during each round of the secure hash algorithm in response to the control bits provided during each round of the secure hash algorithm; and wherein variable values stored in a variable memory are provided to the data path for processing during each round of the secure hash algorithm in response to the physical memory addresses provided during each round of the secure hash algorithm.

19. The method of claim 18, wherein the control bits and the physical memory addresses are provided during each round of the secure hash algorithm to enable the data path to perform reiterative processing of each round of the secure hash algorithm.

20. The method of claim 18, wherein the address control module includes:

a code memory configured to store of codes that are used to direct performance of each round of the secure hash algorithm, the codes comprising the control bits provided during each round of the secure hash algorithm and address information for generating the physical memory addresses provided during each round of the secure hash algorithm.

21. The method of claim 18, wherein the variables include longwords, intermediate variables, initialization constants, and processing constants.

\* \* \* \* \*